US005131934A

United States Patent [19]

Patel

[11] Patent Number: 5,131,934

[45] Date of Patent: Jul. 21, 1992

[54] APPARATUS FOR REMOVING HAZARDOUS PARTICULATE AND FIBROUS MATERIALS

[75] Inventor: Manhar A. Patel, Charleston, W. Va.

[73] Assignee: Union Carbide Chemicals & Plastics Technology Corporation, Danbury, Conn.

[21] Appl. No.: 766,294

[22] Filed: Sep. 27, 1991

[51] Int. Cl.[5] .......... B01D 50/00

[52] U.S. Cl. .......... 55/385.1; 55/500; 55/DIG. 3

[58] Field of Search .......... 55/356, 385.1, 467, 55/500, DIG. 3; 312/1, 3

[56] References Cited

U.S. PATENT DOCUMENTS

| | | | |
|---|---|---|---|
| 4,624,690 | 11/1986 | Byrnes | 55/385.1 |
| 4,783,129 | 11/1988 | Jacobson | 312/1 |
| 4,812,700 | 3/1989 | Natale | 312/1 |
| 4,842,347 | 6/1989 | Jacobson | 312/1 |
| 4,883,329 | 11/1989 | Flannery et al. | 312/1 |

*Primary Examiner*—Charles Hart
*Attorney, Agent, or Firm*—Jean B. Mauro

[57] ABSTRACT

A glove bag assembly comprising a glove bag adapted to be optionally sealed horizontally to create an upper and a lower portion; a valve assembly connected at its inlet to said lower portion via a conduit and at its outlet to a waste container; and vacuum-generating means communicating with splitter valve means, whereby the amount of vacuum applied to the entire assembly can be controlled.

4 Claims, 2 Drawing Sheets

APPARATUS FOR REMOVING HAZARDOUS PARTICULATE AND FIBROUS MATERIALS

BACKGROUND OF THE INVENTION

1. Field of the Invention

This invention relates to an improved apparatus for the safe removal of hazardous particulate and/or fibrous materials, e.g., asbestos, from pipes, ceilings, and the like.

2. Discussion of the Prior Art

Asbestos has been widely used in many sectors of industry during the past fifty years, lasting up until very recent times. Pipe insulation is probably the single most common form of asbestos used in America. If the workers are not adequately protected during the removal, renovation, or demolition work involving the old insulation containing asbestos, overexposure could result.

In recent years, asbestos abatement projects have become increasingly technically sophisticated as the body of knowledge has grown regarding effective control methods. OSHA's construction standard for asbestos requires that whenever asbestos is disturbed, the work area must be sealed off from the rest of the air space. This process of isolating an area is called "containment," and involves erecting an enclosure of polyethylene sheeting to isolate the asbestos abatement area from the rest of the work area. The asbestos removal method commonly used in an abatement project includes the use of a complete walk-in-type enclosure with a negative-pressure system. This method prevents the release of asbestos fiber in order to protect bystanders from exposure to asbestos. Craftsmen working inside the enclosure are protected from exposure to asbestos fibers by wearing appropriate personal protective equipment. Use of this technique is described in OSHA's construction standard for asbestos, 29 CFR 1926.58, Appendix F.

Removal or repair of pipe insulation by itself typically presents a more localized fiber release problem than does removal of the sprayed or troweled-on asbestos insulation on larger surfaces. Some abatement methods for asbestos-containing insulation on pipes are somewhat different from methods used for removing sprayed or troweled-on surfaces. For example, when damage to pipe covering is not extensive, repair rather than removal is the recommended approach. Non-asbestos plastering can restore open joints and wrapped or plastered areas that are damaged. Glove bags may be used for removing small sections of pipe insulation, whereas the large portions of pipe insulation must be removed by erecting containment barriers and using a full range of worker protection.

Building a total enclosure presents special difficulty in pipe racks when considering the manner in which the pipes are configured. For example, it would require sealing the enclosure walls where the pipes penetrate the enclosure. When several pipes run in one or more directions, it would be extremely difficult to seal all pipe penetrations due to the limited space available between pipes. A negative-pressure walk-in enclosure for pipe racks would involve erection of a very complex and extensive barrier system. Proper planning and installation of an effective containment system can be very time-consuming and very costly.

In addition to the difficulties involved in the construction of a well-sealed negative-pressure enclosure, a further problem is the discomfort and hazards to the workers. A major problem is the possibility of heat stress resulting from the solar gains and process radiant heat. Also, pipes or process vessels containing toxic chemicals may present exposure risk to employees due to unplanned release of chemicals inside the enclosure from pressure relief valves, leaking valves, flanges and pumps.

Furthermore, the use of amended (i.e., surfactant-containing) water for wetting down asbestos creates slick walking surfaces on polyethylene and often presents a slipping hazard for employees.

The main purpose of a glove bag is to eliminate the need for constructing extensive enclosures. The goal of using the glove bag is exactly the same as the goal of erecting full-containment facilities, i.e., protecting personnel outside the containment area from asbestos exposure. While glove bags are easy to use, one problem is that the bags may rupture, resulting in the release of collected asbestos, which could create a potential exposure problem for the bystanders. Since their introduction, glove bags have inspired various types of custom uses. Recently, glove bags have been used as negative-pressure containment systems by connecting a vacuum source, fitted with a high efficiency particulate air (HEPA) filter, to a glove bag such that the negative-pressure is created inside the glove bag. This approach has not eliminated the risk of releasing asbestos in the environment, if the glove bag ruptures.

U.S. Pat. No. 4,817,644 discloses a type of glove bag adapted for multiple workers & having a centralized chute to receive asbestos particles, portions of the chute being individually sealable and separable from the remaining length of the chute.

U.S. Pat. No. 4,783,129 discloses a glove bag having shoulders removably sealed to the asbestos-covered pipe, and also having an internal zipper arrangement which is closeable to form a removeable waste catch basin.

U.S. Pat. No. 4,883,329 discloses a glove bag having an internal zipper arrangement which is closeable to form a removeable waste catch basin.

It is an advantage of the present invention that it combines the ease of the glove bag and the effectiveness of the negative-pressure enclosure system. In many situations, this approach could replace the use of a walk-in type negative-pressure enclosure.

It is a further advantage of this invention that once the hazardous material is stripped from its substrate, it does not accumulate inside the glove bag, thus eliminating the possibility of releasing significant amounts of the hazardous material in the event of glove bag damage.

It is still further advantage of this invention that it allows repeated use of the same glove bag.

SUMMARY OF THE INVENTION

The invention comprises an apparatus for the safe removal and disposal of hazardous particulate or fibrous material, said apparatus comprising:

(a) a glove bag configured at its top to be sealingly mountable on a structure to which the hazardous material is adhered, said bag having a generally horizontal sealing means to sealingly divide it into an upper portion and a lower portion, said upper portion communicating with a vacuum-generating means and fitted with a filter means communicating with the atmosphere, said lower portion terminating in a relatively rigid, downwardly-directed, generally funnel-shaped assembly:

(b) a conduit, generally downwardly-directed and sealingly engaging at its upper end said funnel-shaped assembly, and sealingly engaging at its lower end a closure assembly;

(c) said closure assembly comprising a valve means sealingly communicating at its inlet with the conduit and at its outlet with a removeable collection receptacle, said closure assembly being fitted with a filter communicating with the atmosphere and located below said valve means, said closure assembly further communicating with a vacuum-generating means located below said valve means;

(d) both of said vacuum-generating means being fitted with splitter valve means communicating with the atmosphere, whereby the degree of vacuum can be adjusted by controlled admission of atmospheric air.

DESCRIPTION OF THE PREFERRED EMBODIMENTS

Figure 1:
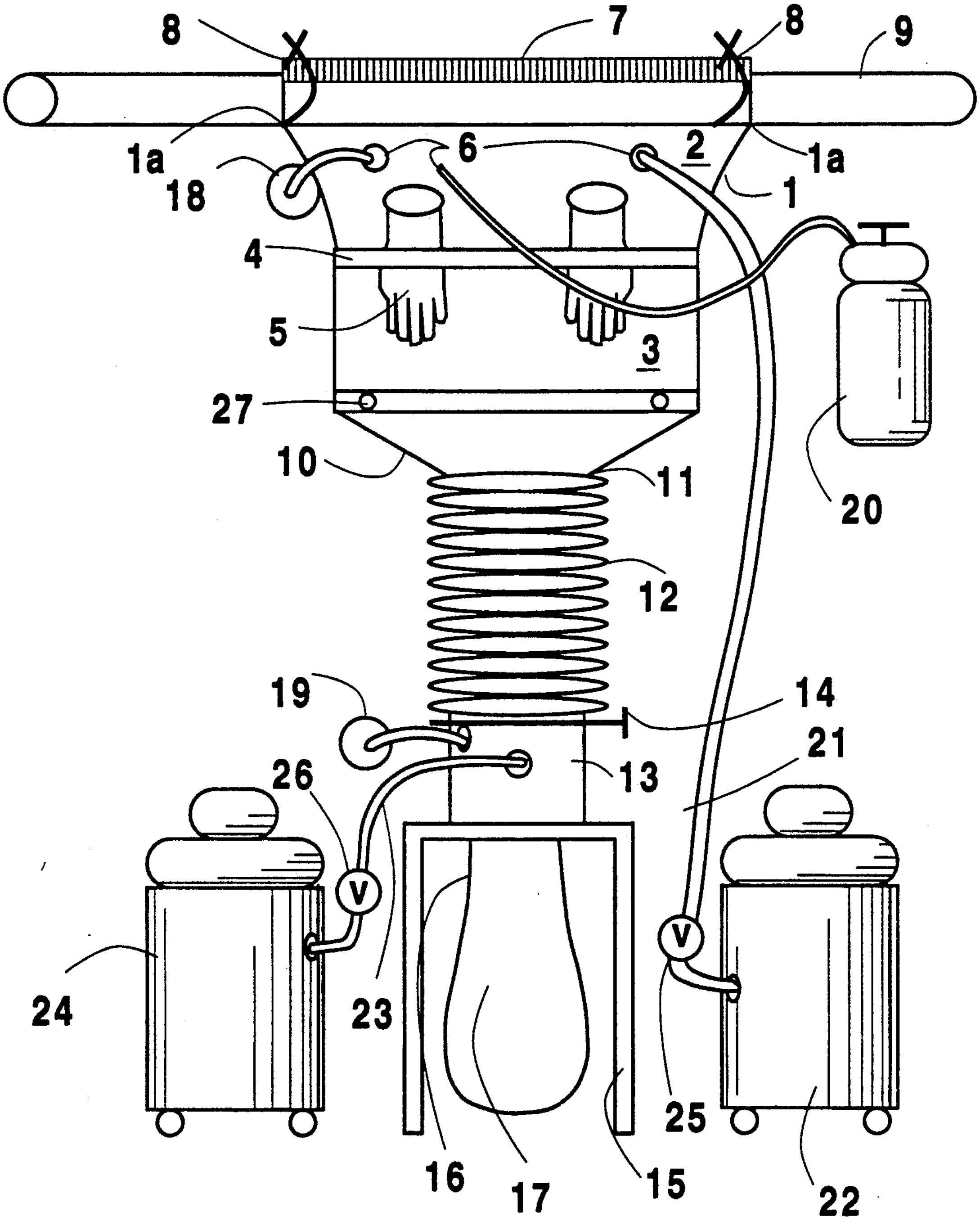
FIG. 1 is a schematic diagram of the improved negative-pressure glove bag assembly of the invention.

Referring to FIG. 1, glove bag 1 comprises an upper portion 2 and a lower portion 3, which may be sealed off from each other by sealing means 4. Glove bag 1, having shoulder portions 1*a*, is conventionally fitted with gloves 5 mounted above sealing means 4, self-sealing aperatures 6, and top zipper 7. End closures 8 seal the glove bag to pipe 9, which is covered with the toxic material, e.g., asbestos, to be removed. Lower portion 3 terminates in a rigid or relatively rigid, funnel-shaped assembly 10, which can be better understood by reference to FIG. 2.

The small end 11 of assembly 10 sealingly engages one end of conduit 12, the other end of which sealingly engages the inlet of closure assembly 13. Assembly 13 is a rigid, or relatively rigid, valve housing which can be internally opened and closed to permit or deny passage of the hazardous material by means of valve means 14, and is mounted on moveable stand 15. Exit portion 16 of assembly 13 sealingly engages removeable collection receptacle 17. Communicating with the atmosphere and with the interior of portion 2 of bag 1, through an aperture 6, is a conventional HEPA-grade filter 18. Communicating with the atmosphere and with the interior of assembly 13, below valve means 14, is another HEPA-grade filter 19.

Communicating with the interior portion 2 of bag 1 through an aperture 6 are a conventional spraying device 20 and, via hose 21, an HEPA-grade vacuum device 22. Communicating with the interior of assembly 13, below valve means 14, via hose 23, is another HEPA-grade vacuum device 24. Vacuum devices 22 and 24 are fitted with splitter valve means 25 and 26, respectively. These splitter valve means are here shown as valves mounted in hoses 21 and 23; however, it will be readily understood that these valves could also be mounted on their respective vacuum devices, or in the case of valve 26, on assembly 13. It will also be readily appreciated that vacuum devices 22 and 24 could also be combined into a single unit, with appropriate changes to hose configuration.

Figure 2:
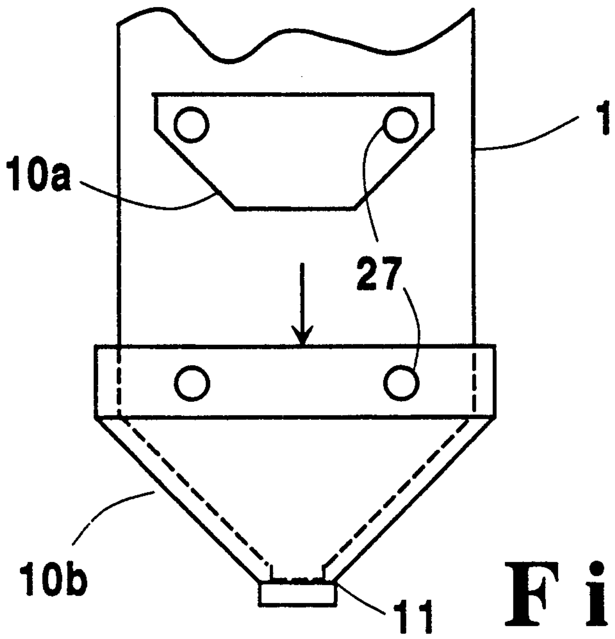
FIG. 2 is schematic diagram of the funnel-shaped assembly forming the outlet of the glove bag.

Referring to FIG. 2, assembly 10 comprises an inner funnel element 10 placed within bag 1. Element 10*a* is matingly fitted into outer funnel element 10*b*, so as to sealingly sandwich bag 1 therebetween. Elements 10*a* and 10*b* are held in essentially rigid engagement by means of conventional fixing devices 27, such as bolts with nuts, thereby forming an assembly which permits secure attachment of bag 1 to conduit 12.

Figure 3:
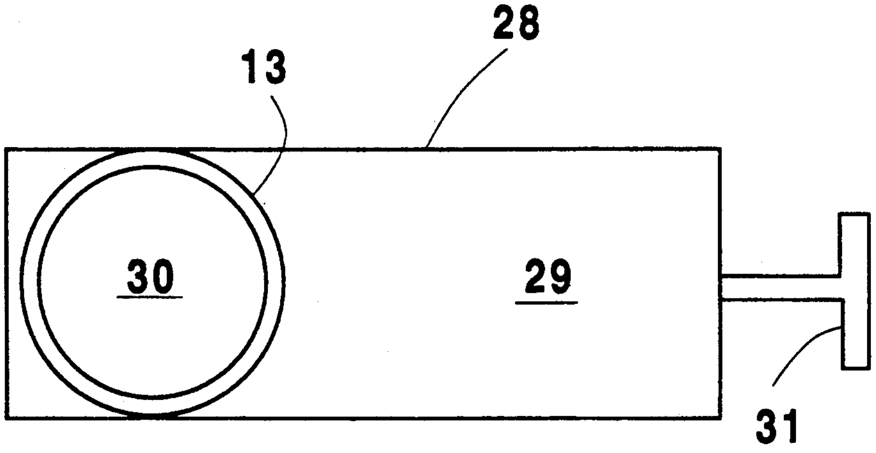
FIG. 3 is a cross-sectional diagram of a preferred valve assembly, which communicates with the glove bag (via a conduit means) and with a debris collection means.

Referring to FIG. 3, assembly 13, in the embodiment shown, comprises a single gate valve comprising a flat, sliding blade 28 having a solid portion and an open portion 30 of cross-section essentially the same as the cross-section of conduit 12. Blade 28 is moved back and forth by means of handle 31 so as to alternatively block or open communication between conduit 12 and receptacle 17.

Glove bags for the safe removal of particulate hazardous material, such as asbestos, have become well known in recent years; see, for example, U.S. Pat. No. Nos. 4,783,129; 4,817,644; and 4,883,329, the disclosures of which are incorporated herein by reference. Certain significant disadvantages inhere in glove bags, however. More specifically, they typically collect 200 pounds or more of asbestos-laden water, which makes the bag difficult and treacherous to move and detach from the pipe or other overhead unit to which the bag has been attached. Such bags are also prone to rupture, causing serious spills of asbestos as well as creating a slipping hazard for workers. Moreover, the bags are relatively expensive to purchase, and must be discarded after each use.

The present invention solves these problems by providing a glove bag apparatus wherein the glove bag is used repeatedly, and the possibility of significant asbestos release in the event of glove bag rupture is essentially eliminated.

Referring again to the Figures, glove bag 1 may be of a conventional type, fitted with a generally horizontal zipper, but preferably fitted with elongated shoulders 1*a* to facilitate sealing attachment to the hazardous material-bearing pipe, or other surface. It will be appreciated, of course, that the upper portion of the glove bag can be adapted for attachment to surfaces other than pipe, e.g., to a ceiling, without departing from the spirit and scope of the Present invention. While conventional strap means can be used to secure shoulders la to the pipe, it has been found that common surgical tubing is a simple, cheap and effective substitute for other, more complex, strapping means.

While, in a preferred embodiment, sealing means 4 comprises a zipper, alternatives are possible. For example, if it were decided to utilize a glove bag not fitted by its manufacturer with a zipper means, an external clamping means could be applied to sealingly divide bag 1 into upper portion 2 and lower portion 3.

The preferred commercially available glove bag is the "ULTRA SAFE" glove bag supplied by Pro Control Products of Lake-In-The-Hills, Illinois. It is made of 10 mil, optically clear PVC plastic, in contrast with the commonly used 6 mil and 8 mil polyethylene material. A 10 mil thickness for the glove bag material is preferred because of its sturdiness, which has shown a far lower rate of rips in comparison to traditional glove bags.

Funnel assembly 10 is preferably of typical funnel-shaped configuration, that is, circular in cross-section and having its upper opening larger layer in diameter than its lower opening. It will be understood, however, that assembly 10 could also be eliptical or rectilinear in cross-section, if desired, provided only that assembly 10 communicate sealingly with bag 1 and conduit 12, as by appropriate adapters (not shown), if necessary. In an alternative embodiment within the scope of the invention, assembly 10 could be permanently affixed to conduit 12. In another possible embodiment, conduit 12 at point 11 could be of the same cross-sectional dimensions as lower bag portion 3, thereby eliminating the need for a funnel-type configuration.

In setting up the apparatus in the embodiment shown, funnel element 10*a* is placed into the bottom of bag 1, thereby causing the bottom of bag 1 to assume the general shape of element 10*a*. Element 10*b*, which is closely matched in size and shape to element 10*a*, is then fitted externally onto element 10*a*, thereby sandwiching bag 1 tightly between the two elements. Elements 10*a* and 10*b* are then fixed in position relative to each other by use of conventional fastening devices 27, such as bolts with wing nuts, which communicate between elements 10*a* and 10*b* through the wall of bag 1. The bottom of bag 1 is then cut away at point 11 to permit free communication with conduit 12.

Conduit 12 is preferably a relatively flexible hose of convenient diameter, preferably about 12 inches in diameter. Conduit 12 may, of course, be rigid, if desired, and need not necessarily be of circular cross-section, as discussed previously.

Closure assembly 13 is illustrated as a horizontal sliding gate valve, since this type of valve is simple, cheap and effective. In order to minimize or prevent the escape of particulate hazardous material when blade 28 is moved, it is preferred that the carrying members (not shown) for blade 28 be fitted with a flexible seal (not shown) capable of sweeping clean the surface of blade 28 as it is moved, and likewise sealing blade 28 in its housing.

It will be appreciated that assembly 13 may comprise a valve means of appropriate design other than a gate valve. In fact, valve means 14 may not necessarily be a valve at all; it could take the form of, e.g., an externally applied clamp applied to a suitably flexible upper portion (not shown) of assembly 13, or to a suitable flexible portion (not shown) of conduit 12.

Splitter valves 25 and 26 may be of any convenient design. For instance, it has been found that off-the-shelf garden hose splitter valves function satisfactorily for purposes of the invention. Alternatives are obviously possible, such as flexible "Y" or "T" connectors, to one leg of which an external, adjustable clamp is applied.

To operate the apparatus of this invention efficiently, it is suggested that a team of three persons be employed. One person is responsible for wetting the insulation with amended water using sprayer 20. Another person is responsible for cutting and removing the insulation. The third person is responsible for replacing the waste bags 17 as they are filled.

Throughout the asbestos removal process, each worker wears personal protective equipment that includes HEPA cartridge respirator, disposable coverall, head cover, and boots. First, all the tools needed to remove asbestos are placed in the inner pouch (not shown) of the glove bag. The bag is installed on a pipe utilizing zipper 7 provided at the top. Shoulders 1a are fastened on both ends of the glove bag with tourniquets. The rest of the system is put together as previously described. Valve means 14 is left open to allow collection of asbestos in the waste bag. Vacuum in the bag and in the rest of the system is adjusted to prevent collapse of the bag. When waste receptacle bag 17 is almost full, valve means 14 is closed as the vacuum in the system is slowly controlled by adjusting the splitter valves, and the bag is carefully sealed and removed. A new bag is installed and the valve means opened. When all asbestos inside the glove bag is removed, the pipe and the wall of the glove bag above middle zipper 4 inside the bag are rinsed with amended water. The middle zipper is closed to isolate the upper compartment while vacuum is still being pulled. The tourniquet on either end of the glove bag is loosened and the bag is moved to the next position. The middle portion of the bag is unzipped and the work is continued.

What is claimed is:

1. An apparatus for the safe removal and disposal of hazardous particulate or fibrous material, said apparatus comprising:

(a) a glove bag configured at its top to be sealingly mountable on a structure to which the hazardous material is adhered, said bag having a generally horizontal sealing means to sealingly divide it into an upper portion and a lower portion, said upper portion communicating with a vacuum-generating means and fitted with a filter means communicating with the atmosphere, said lower portion terminating in a relatively rigid, downwardly-directed, generally funnel-shaped assembly:

(b) a conduit, generally downwardly-directed and sealingly engaging at its upper end said funnel-shaped assembly, and sealingly engaging at its lower end a closure assembly;

(c) said closure assembly comprising a valve means sealingly communicating at its inlet with the conduit and at its outlet with a removeable collection receptacle, said closure assembly being fitted with a filter communicating with the atmosphere and located below said valve means, said closure assembly further communicating with a vacuum-generating means located below said valve means;

(d) both of said vacuum-generating means being fitted with splitter valve means communicating with the atmosphere, whereby the degree of vacuum can be adjusted by controlled admission of atmospheric air.

2. An apparatus of claim 1 wherein the valve means of said closure assembly comprises a gate valve.

3. An apparatus of claim 2 wherein the valve means comprises a sliding gate valve.

4. An apparatus of claim 1 wherein the conduit is a flexible conduit.

* * * * *